Patented Mar. 17, 1931

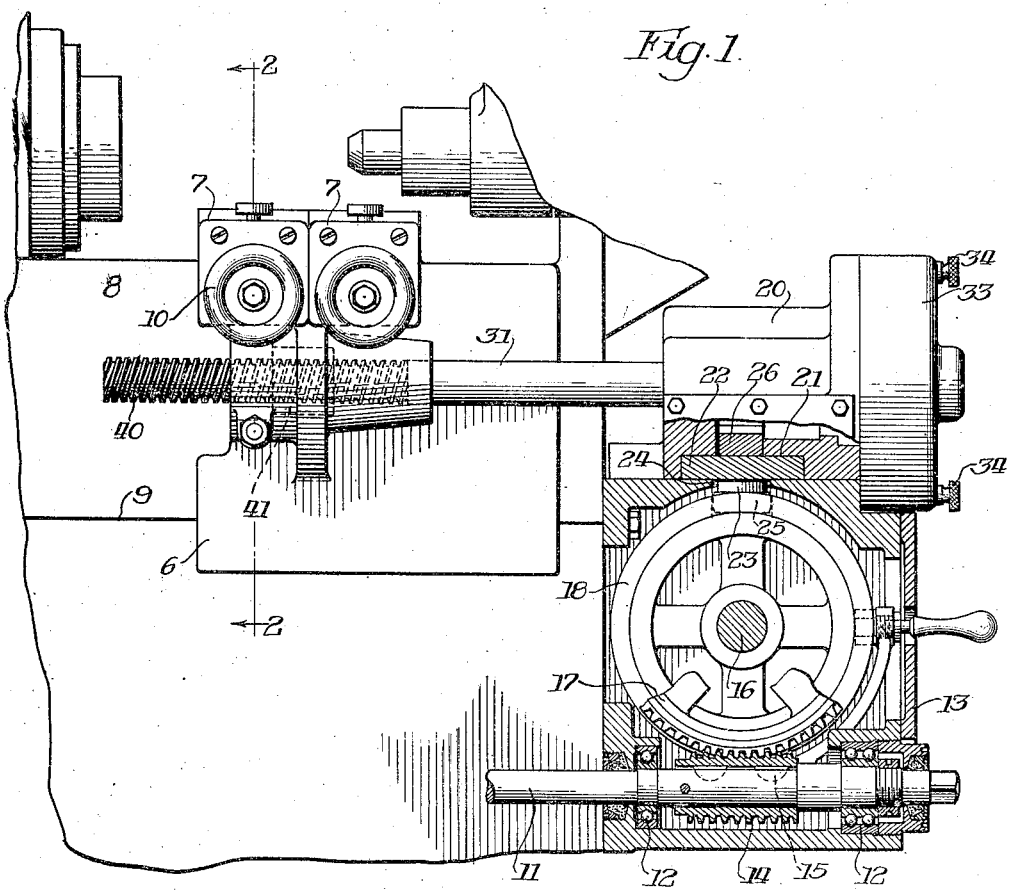

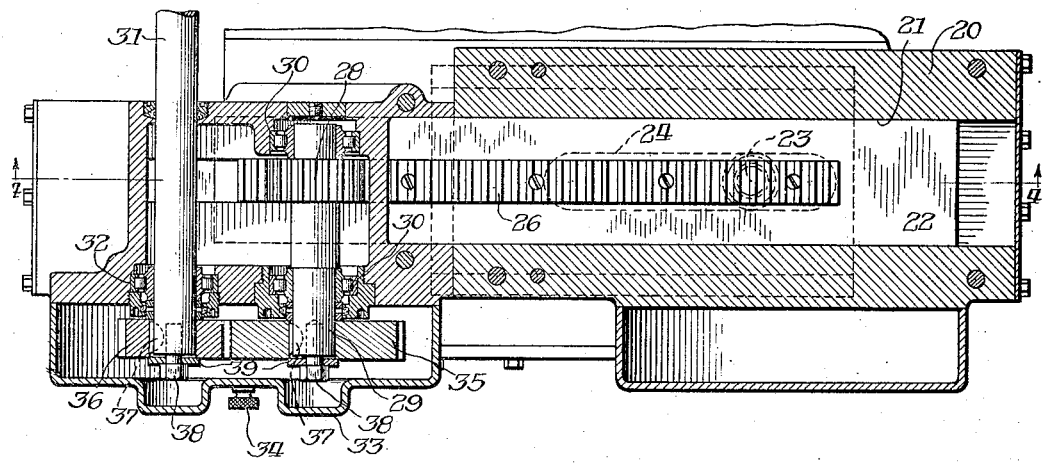
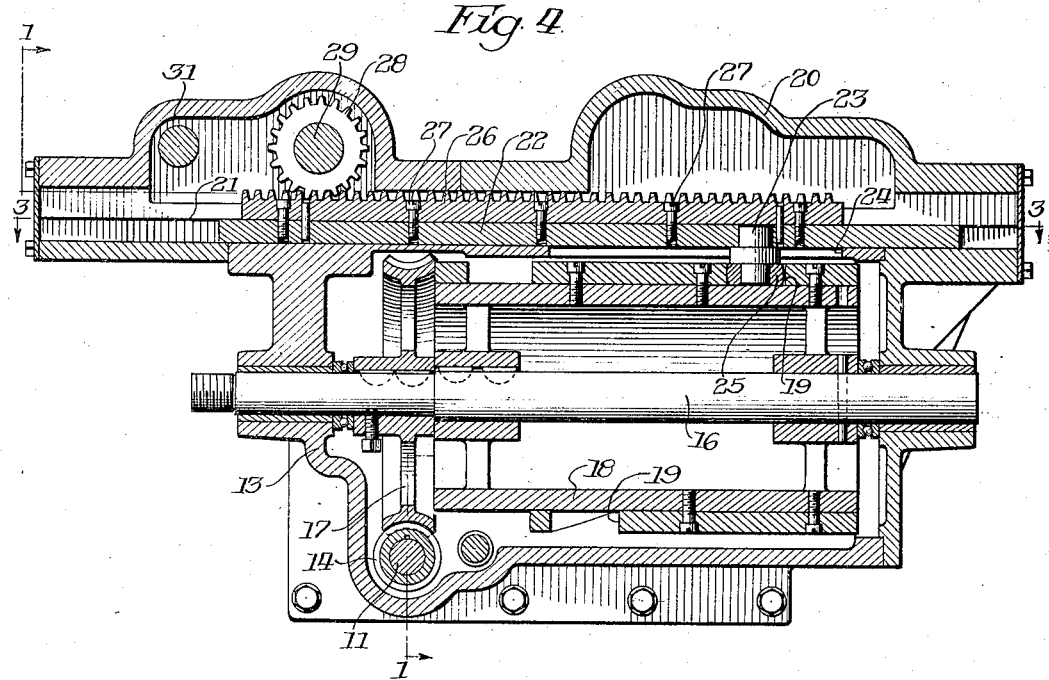

1,797,216

UNITED STATES PATENT OFFICE

ERNEST J. SVENSON, OF ROCKFORD, ILLINOIS, ASSIGNOR TO SUNDSTRAND MACHINE TOOL CO., OF ROCKFORD, ILLINOIS, A CORPORATION OF ILLINOIS

CARRIAGE FEED MECHANISM

Application filed July 5, 1927. Serial No. 203,379.

The invention relates generally to feed mechanisms and more particularly to a feed mechanism for a movable element of a machine tool.

It is an object of the invention to provide a new and improved feed mechanism by which a variation of the movement of an element may be effected.

Another object is to provide a new and improved mechanism for effecting the reciprocation of an element which mechanism is capable of being readily and easily adjusted to change the length of the stroke of the element.

A more specific object is to produce a new and improved feed mechanism in which a prime mover and an element ultimately deriving motion therefrom are operatively connected through the intermediate agency of a cam mechanism which controls such motion, with a means associated with the cam operated parts which may be adjusted to vary the extent of the motion.

A further object is to provide a feed mechanism for a reciprocating tool or work support embodying a power driven cam and a gearing connection between the cam follower and support including change gears arranged to permit of a variation of the length of stroke of the support.

Other objects and advantages will become apparent from the following description, and the accompanying drawings, in which:

Figure 1 is a fragmentary front elevation of a machine embodying the features of the invention, part of which is in section taken on the line 1—1 of Fig. 4 looking in the direction of the arrows.

Fig. 2 is a sectional view of a supporting member taken on the line 2—2 of Fig. 1.

Fig. 3 is a sectional plan view of a part of the operating mechanism taken on the line 3—3 of Fig. 4.

Fig. 4 is a sectional view of the operating mechanism taken on the line 4—4 of Fig. 3.

Although the invention is susceptible of various modifications and alternative constructions, I have shown in the drawings and will herein describe in detail the preferred embodiment but it is to be understood that I do not thereby intend to limit the invention to the specific form disclosed but intend to cover all modifications and constructions falling within the scope of the invention as expressed in the appended claims.

In the exemplary embodiment herein shown, the invention is disclosed as embodied in a lathe for actuating a tool supporting carriage. 6 designates generally a movable support for carrying a tool slide 7 along the bed 8 of the machine. In this instance the support 6 is arranged to reciprocate on ways 9 longitudinally of the machine and the slide 7 is manually adjustable transversely of the support in a suitable manner, as by the hand screw 10.

During the operation of the machine the support 6 is moved in one direction to make a working stroke and at the end of said stroke is returned to the initial position. Obviously in a machine of varied uses it will frequently occur that a stroke which is suitable for one piece of work will be too long or too short for another piece of work. Therefore, it is desirable to provide means by which an adjustment of the length of the stroke may be attained.

To this end the reciprocatory movement of the support is derived from a prime mover or driven shaft 11 (Fig. 1) through an intermediate agency which agency includes parts adjustable to enable an operator readily to change the length of the stroke.

As shown in Fig. 1, the prime mover or drive shaft 11 is journalled in ball bearings 12 mounted in either side of a housing 13 suitably secured to one end of the machine. Intermediate the bearings 12 a worm 14 is mounted on the shaft as by means of the keys 15. A second or cam shaft 16 also journalled in the housing 13 extends therethrough with its axis transverse to that of the drive shaft. The cam shaft 16 carries and is driven by means of a worm gear 17 rigidly keyed thereto, arranged in intermeshing engagement with the worm 14 on the drive shaft 11. A cam drum 18 (Fig. 4) is also rigidly keyed on the cam shaft 16 for rotation therewith and is provided on its surface with cams defining an appropriately formed cam slot 19.

A casing or cover 20 mounted upon the housing 13 extends parallel with the cam shaft 16 and is arranged to provide, with the housing, a slide-way 21 parallel to and in relatively close association with the drum 18. An elongated slide 22 is adapted to reciprocate in the slide-way and has, near one end, a follower or pin 23 which extends through an elongated aperture 24 in the housing 13 to support a roller 25 in the cam slot 19. Thus, for example, if the cam drum is arranged to be driven in one direction and is provided with a continuous cam slot, the slide will be reciprocated in the slide-way 21 as the cam drum 18 is rotated by the drive shaft 11.

A rack 26 is carried upon the opposite face of the slide 22 and may be secured thereto in any suitable manner, as by means of screws 27. The rack is arranged to mesh with a pinion 28 near one end of the slide-way, which pinion is mounted on a stub shaft 29 suitably journalled in bearings 30 (Fig. 3) in the side walls of the casing 20. As illustrated, the stub shaft 29 is mounted with its axis of rotation transverse to the direction of movement of the slide 22.

Paralleling the stub shaft 29 is a driven shaft 31 journalled in a bearing 32 in the side wall of the rack casing 20. In the exemplary form of the invention the shaft 31 extends out of the casing toward the movable support 6 to serve as a feed shaft therefor. The adjacent ends of the stub and driving shafts 29 and 31 project through the wall of the casing 20 into a compartment formed by a removable cover 33 or the like suitably held on the casing as by means of headed screw devices 34.

To alter the stroke of the movable support the invention in its preferred form contemplates a means intermediate the pinion shaft 29 and the feed shaft 31 adapted to permit of adjusting the speed ratio therebetween. Thus, as illustrated herein, the projecting ends of the shafts 29 and 31 are adapted to receive a pair of complementary pick-off gears 35, 36 which may be keyed, as at 37, to the shafts for rotation therewith, but which are secured thereon for ready removal by means such as the screws 38 and washers 39.

The other end of the driven shaft 31 extends outwardly from the casing and into driving engagement with the support 6 and may be provided with screw threads 40 (Fig. 1) arranged to engage a nut 41 suitably mounted on the support. Thus rotation of the feed shaft 31 in one direction will move the support 6 along its ways in a forward stroke and a reverse rotation of the shaft will effect a return movement of the support to its initial position.

In operation, movement of the support is effected in the following manner. The prime mover or drive shaft 11 rotates the cam drum 18 by means of the worm and worm wheel drive 14, 17, whereupon the cam follower 23 moves in the cam slot 19 in the drum 18 and reciprocates the slide 22 and the rack 26 carried thereby to rotate the pinion 28 and the stub shaft 29. The stroke of the rack will necessarily be fixed in length as determined by the cam slot on the drum. The rotation of the stub shaft is transmitted through the intermediate pick-off gears 35, 36 to the feed shaft 31 which in turn effects the reciprocatory travel of the support 6 by reason of the screw 40 and nut 41.

It will be readily apparent that the degree of rotation of the shaft 31 will control the extent of movement or, in other words, the length of the stroke of the support 6, and that by replacing one set of complementary pick-off gears with a set having a different driving ratio, the length of the stroke of the support may be increased or decreased as desired. Thus a device has been provided in which, by a simple and easily performed operation, the length of the reciprocatory stroke of the support may be altered without changing the character of the cam drum.

I claim as my invention:

1. A lathe having, in combination, a bed, a carriage slidable longitudinally of the lathe bed, a drive shaft extending longitudinally of the lathe, a cam shaft journaled transversely of one end of the lathe bed and arranged to be driven by said drive shaft, a cam drum mounted on said cam shaft, a slide mounted to be reciprocated parallel to the axis of the cam drum by cams on the drum, a rack movable with said slide, a pinion shaft having a pinion thereon arranged to mesh with said rack, a carriage feed shaft mounted longitudinally of the bed, a driving connection between the feed shaft and said carriage, and change gears between said feed and pinion shafts to permit of adjustment of the length of the stroke of the carriage.

2. A lathe having, in combination, a driving shaft, a carriage, a cam drum driven from said shaft, a rack operatively connected to said cam and arranged to be reciprocated thereby, a feed shaft for said carriage, a pinion in mesh with said rack and mounted on a shaft parallel to said feed shaft, and a pair of pick-off gears interposed between said pinion shaft and said feed shaft.

3. In a feed mechanism, the combination of a cam drum, a rack arranged to be reciprocated by the rotation of said cam drum, a pinion engaging said rack driven reversibly during the reciprocation of the rack, a shaft carrying said pinion and rotatable therewith, a feed screw, a carriage having a nut engaged by said feed screw for effecting a feeding and return movement of the carriage, and change gears between said pinion shaft and said feed screw whereby the length of travel of said carriage may be adjusted without altering the cams on said drum.

4. A feed mechanism for a reciprocatory work or tool support comprising, in combination, a power driven cam, a cam follower, and a gearing connection between the follower and the support including alterable change gears.

5. A feed mechanism for reciprocating a work or tool support comprising, in combination, a reversible feed shaft operatively connected with said support, an element reciprocating over a stroke of constant length, and change gears intermediate said element and said feed shaft.

6. In a feed mechanism, a prime mover, an element ultimately deriving motion therefrom, and means disposed therebetween for operatively connecting said prime mover and said element, said means including a rack and pinion, a cam mechanism arranged to impart a stroke of unvarying length to said rack, and alterable change gears intermediate said pinion and said element for adjusting the stroke of said element.

7. A feeding mechanism for a reciprocating support comprising, in combination, a drive shaft, cam means driven by said shaft, a rack and pinion operated by said cam means, a feed shaft for effecting the reciprocation of said support arranged to move said support a given distance for each revolution of said feed shaft, and means intermediate said pinion and the feed shaft for conveniently changing the relative rotative movement of said feed shaft and said pinion, whereby to adjust the extent of the stroke of said support.

8. In a feed mechanism, a prime mover, a reciprocating support, a shaft connected to and adapted to effect the reciprocation of said support arranged to move said support a given distance for each revolution of said feed shaft, a rack and pinion, a cam driven by said prime mover to actuate said rack, and connecting means interposed between said pinion and said shaft adapted to permit of changing the speed ratio thereof.

9. In a feed mechanism, a prime mover, an element ultimately deriving a reciprocatory motion therefrom, a member arranged to be oscillated by said prime mover through strokes of constant length, and means intermediate and operatively connecting said member and said element, said means including a pair of change gears changeable to vary the stroke of said element.

10. In a feed mechanism, an oscillating member, means for effecting the oscillation of said member, a movable element adapted to reciprocate through feed and return strokes, driving means engaging said movable element for effecting the movement thereof through said strokes, and means operatively connecting the oscillating member and the driving means, said means including a pair of change gears arranged to permit of substitution whereby the length of the stroke of said movable element may be varied.

11. In a feed mechanism, the combination of a cam means, an oscillating member of constant stroke driven by said cam means, a movable element, a reversible feed screw connected to said movable element and adapted to move said element through forward and return strokes, and means connecting said feed screw with said oscillating member including change gears.

In testimony whereof, I have hereunto affixed my signature.

ERNEST J. SVENSON.